(12) United States Patent
Royt

(10) Patent No.: US 11,858,595 B2
(45) Date of Patent: Jan. 2, 2024

(54) DECK HOOK FOR HEAVY CARGO

(71) Applicant: Peck & Hale, L.L.C., West Sayville, NY (US)

(72) Inventor: Joseph Royt, Fresh Meadows, NY (US)

(73) Assignee: Peck & Hale, L.L.C., West Sayville, NY (US)

( * ) Notice: Subject to any disclaimer, the term of this patent is extended or adjusted under 35 U.S.C. 154(b) by 428 days.

(21) Appl. No.: 17/343,320

(22) Filed: Jun. 9, 2021

(65) Prior Publication Data

US 2022/0001960 A1    Jan. 6, 2022

Related U.S. Application Data

(60) Provisional application No. 63/037,149, filed on Jun. 10, 2020.

(51) Int. Cl.
| | | |
|---|---|---|
| B63B 25/28 | (2006.01) | |
| B63B 21/04 | (2006.01) | |
| B60P 7/08 | (2006.01) | |

(52) U.S. Cl.
CPC ............ B63B 25/28 (2013.01); B60P 7/0807 (2013.01); B63B 21/04 (2013.01)

(58) Field of Classification Search
CPC ......... B63B 25/28; B63B 21/04; B60P 7/0807
USPC ................... 410/77, 101, 106, 109, 112, 114
See application file for complete search history.

(56) References Cited

U.S. PATENT DOCUMENTS

| | | | |
|---|---|---|---|
| 2,962,245 A | * | 11/1960 | Molzan .................... F16G 15/00 |
| | | | 410/101 |
| 3,233,319 A | * | 2/1966 | Jensen .................. B61D 45/001 |
| | | | 410/108 |
| 4,229,132 A | | 10/1980 | Taylor |
| 4,630,982 A | | 12/1986 | Fenner |
| 4,969,784 A | | 11/1990 | Yankee |
| 5,052,869 A | | 10/1991 | Hansen, II |
| 5,738,471 A | | 4/1998 | Zentner |
| 6,793,449 B1 | | 9/2004 | Simpson |
| 8,128,325 B2 | | 3/2012 | Selberg |
| 8,414,237 B2 | | 4/2013 | Grasso |
| 8,529,176 B2 | | 9/2013 | Jutila |
| 8,568,070 B2 | * | 10/2013 | Meszaros .............. B60P 7/0807 |
| | | | 410/101 |
| 8,591,156 B2 | | 11/2013 | Grone |
| 9,290,240 B1 | * | 3/2016 | Royt ...................... B60P 7/0807 |
| 10,118,674 B1 | * | 11/2018 | Jeffrey .................. B60P 7/0823 |
| 2008/0145171 A1 | | 6/2008 | Smetz |
| 2014/0286724 A1 | * | 9/2014 | Grone ..................... B60P 3/122 |
| | | | 410/106 |

OTHER PUBLICATIONS

Drawing, Tiedown Assembly, 2012.

* cited by examiner

*Primary Examiner* — Amy R Weisberg
*Assistant Examiner* — Sunsurraye Westbrook
(74) *Attorney, Agent, or Firm* — Schroeder Law PC

(57) ABSTRACT

A deck hook having the capability 1) to accept loading force in wide space angles of multiple directions, and 2) to distribute loading forces over increased deck/socket surface areas thereby increasing durability of the deck elements built from non-steel materials.

5 Claims, 6 Drawing Sheets

SECTION A-A from FIG. 1

SECTION B-B FROM FIG. 4

DECK HOOK FOR HEAVY CARGO

FIELD OF THE INVENTION

The present invention relates to deck hooks and, more particularly, to a deck hook capable of accepting extra heavy forces in multiple directions and of distributing such forces over increased hook contact surfaces.

BACKGROUND OF THE INVENTION

Decks of vessels, particularly ships, are often designed with a pattern of deck sockets with four radial blind slots with rounded ends to receive what is commonly referred as a "deck hook". One typical-sized slot has a 1.75" width and is rounded by a radius equal to approximately one-half the slot width. Traditionally, deck sockets top plates are built from steel being 0.50 to 0.75 inches thick.

Tie down assemblies including end elements, e.g., deck hooks, are commonplace on naval and maritime vessels for security of cargo, aircrafts, tanks, and trucks, and other heavy items and equipment. Deck hooks are typically installed within the deck sockets of the vessel and need to be strong enough to endure heavy loads.

Originally, deck hooks were manufactured as one solid body with curved surfaces to tangentially contact the flat surfaces of the deck or the sockets welded to the deck. Tangent contact areas of the curved and flat surfaces were always limited and were the reason for damage and wear to the sockets, which are difficult and costly to replace. This problem was partially solved by the implementation of higher strength steel materials for the hooks and sockets.

Newer ships, especially naval ships, have switched from steel decks to decks made of aluminum alloys. These newer ships still rely upon the usage of deck hooks to secure cargo to the deck. However, the change in material from steel to aluminum alloy increases the risk that usage of the prior art deck hook may increase the wear/damage of the deck sockets of the vessel when subjected to the same value of loading forces.

There is therefore the need in the art for a deck hook having the capability 1) to accept loading force in wide space angles of multiple directions, and 2) to distribute loading forces over increased deck/socket surface areas thereby increasing durability of the deck elements built from non-steel materials.

SUMMARY OF THE INVENTION

The present invention, which addresses the needs of the prior art, provides a deck hook for connection to a socket installed in a deck of a transportation vehicle, the socket having a thickness T and including a plurality of slots, each of the slots defining a width W and having a rounded end located proximate the outer circumference of the socket. The deck hook includes a body member having an upper part and a lower part extending at an angle from the upper part, each of the upper and lower parts including a pair of opposing coaxially-located holes. The deck hook further includes an upper foot having an opening therethrough, the upper part extending through the opening in the upper foot, the upper foot being pivotally connected to the upper part. The deck hook further includes a lower foot having an opening therethrough, the lower part extending through the opening in the lower foot, the lower foot being pivotally connected to the lower part. The body member defines an axis Z, the axis Z passing through the center of one of the holes in the upper part and through the center of one of the holes in the lower part, the axis Z being oriented perpendicular to the upper surface of the socket, the axis Z defining a distance "T+a" between a lower surface of the upper foot and an upper surface of the lower foot. The distance "T+a" is selected to allow installation of the hook within the slot of said socket. Finally, a distance T is defined between a lower surface of the upper foot and an upper surface of the lower foot when the hook is in an installed condition.

As a result, the present invention provides a deck hook having the capability 1) to accept loading force in wide space angles of multiple directions, and 2) to distribute loading forces over increased deck/socket surface areas thereby increasing durability of the deck elements built from non-steel materials.

DETAILED DESCRIPTION OF THE INVENTION

Figure 1:
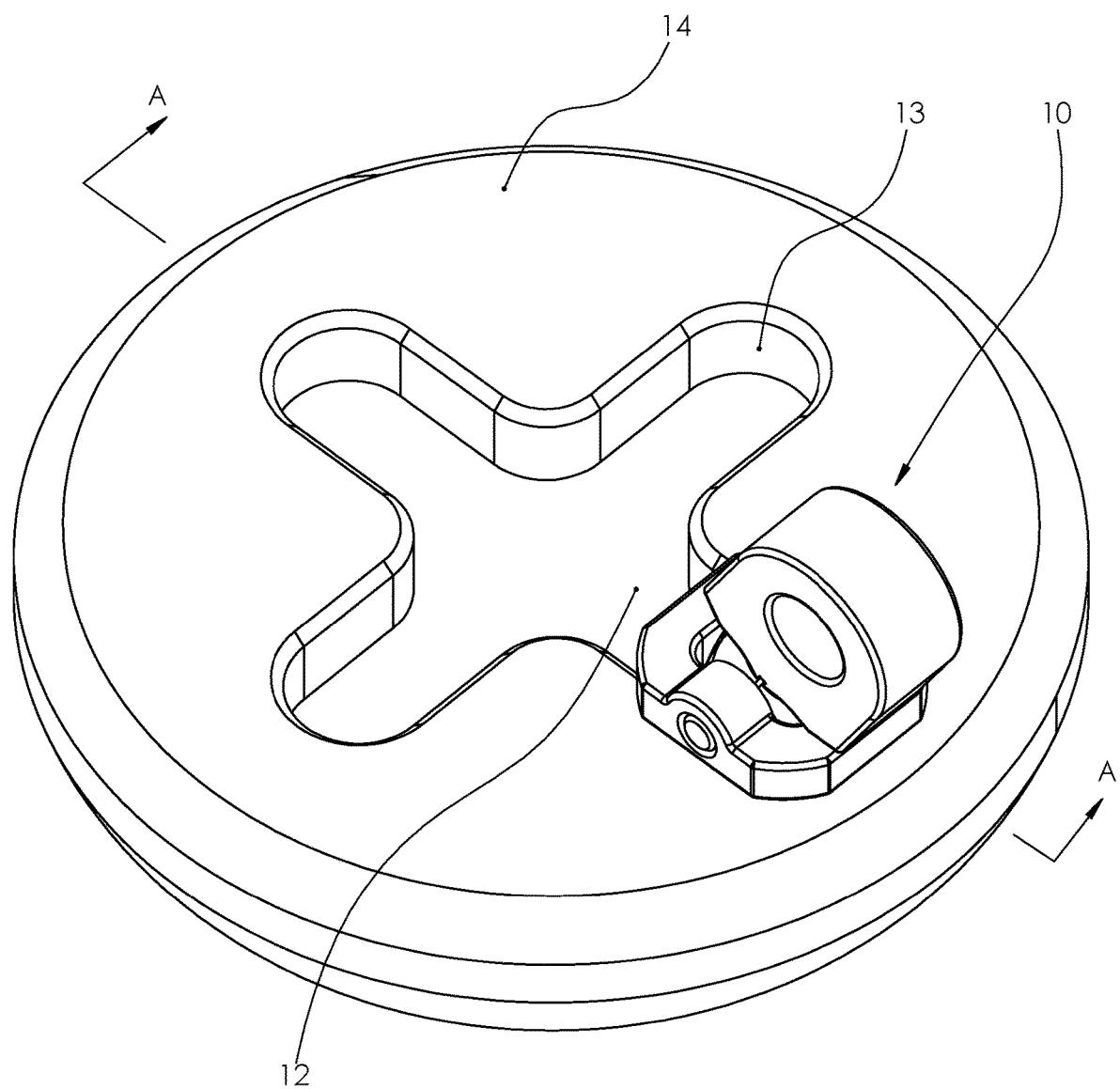
FIG. 1 is a top perspective view showing a deck hook of the present invention installed in a slot of a conventional deck socket.
Figure 2:
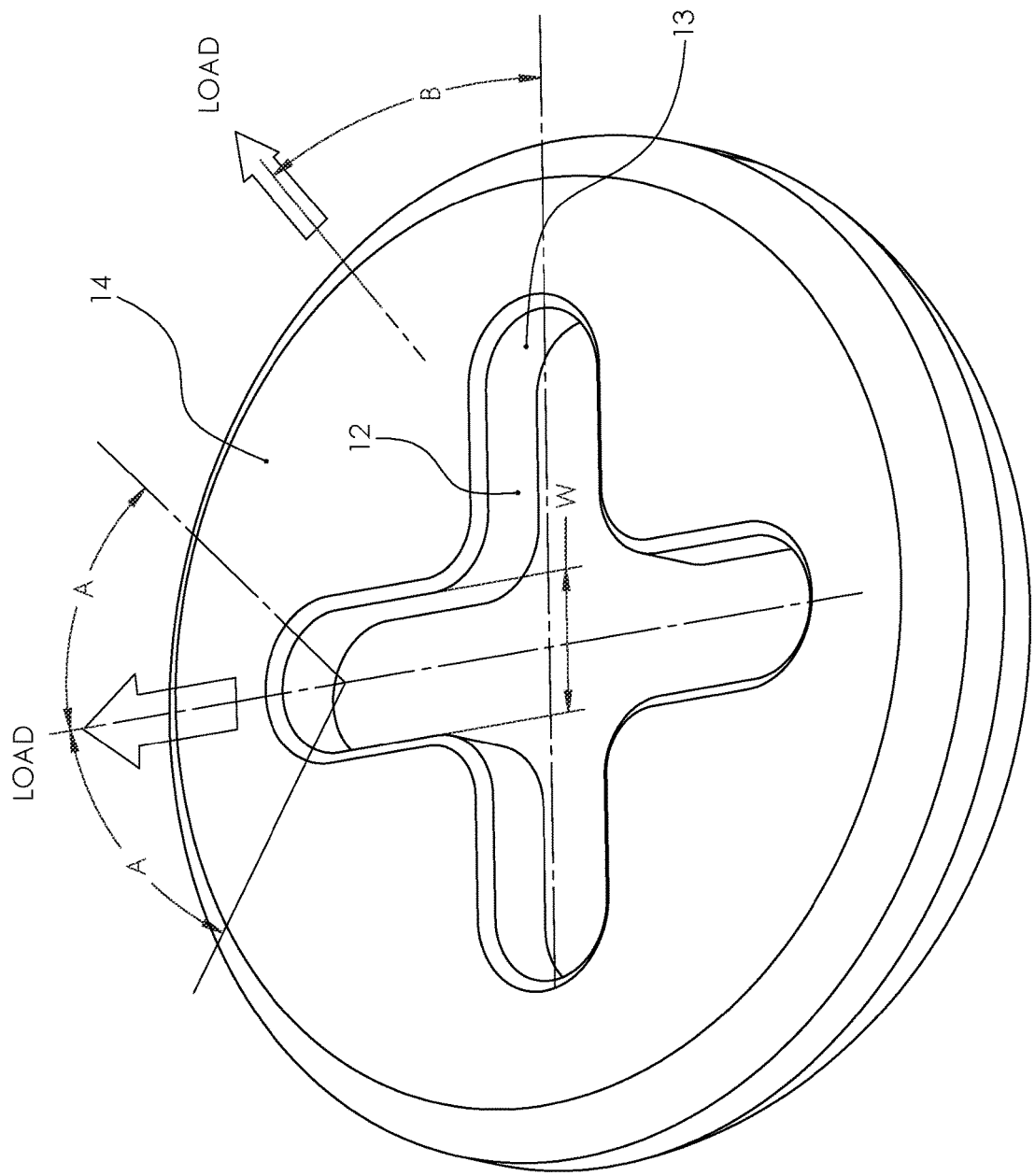
FIG. 2 is a top perspective view showing the multiple direction of loading forces experienced by a conventional deck socket.
Figure 3:
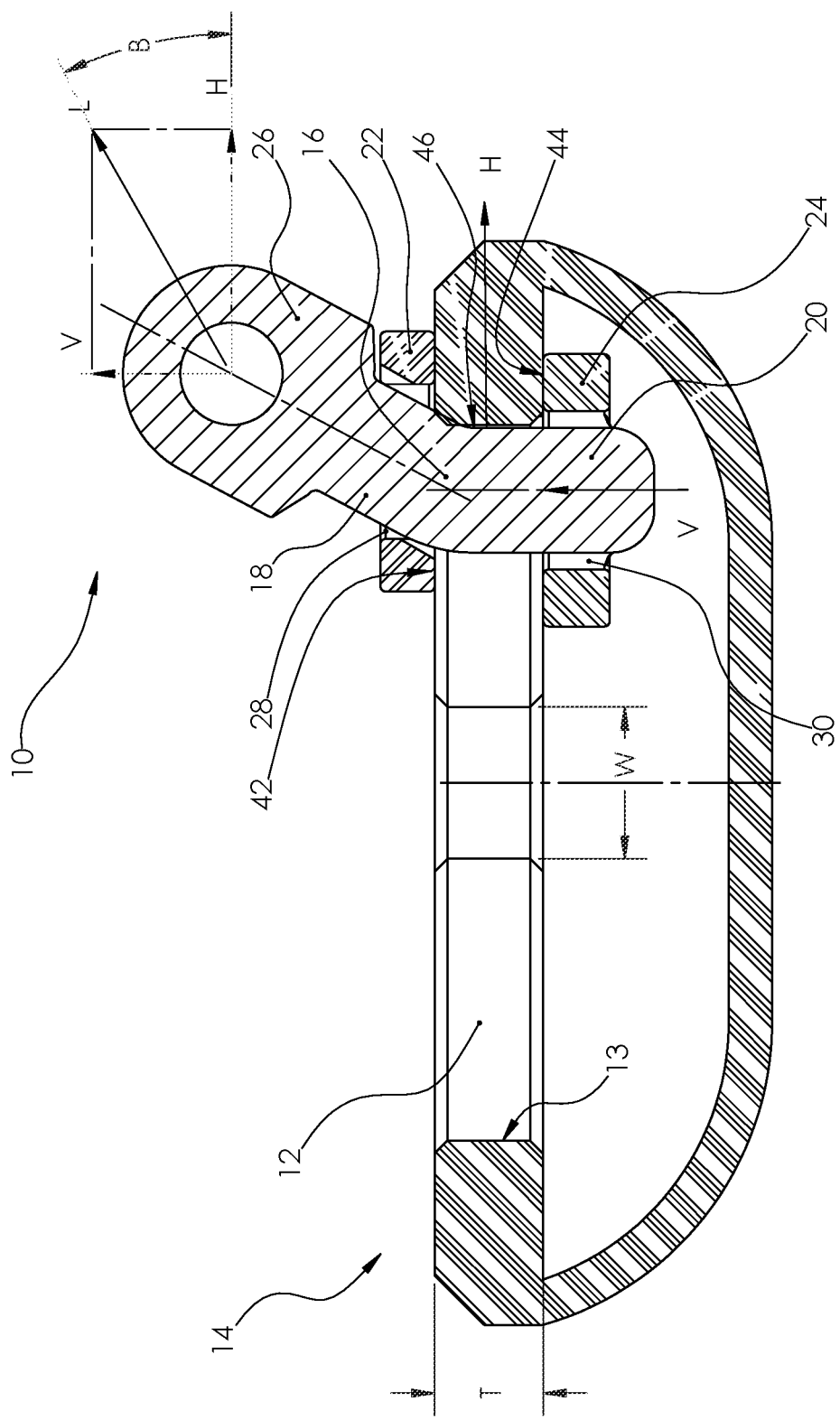
FIG. 3 is a cross-sectional view taken along lines A-A of FIG. 1.

An improved deck hook, i.e., hook 10, is shown in FIG. 1. Hook 10 is designed to engage one of the four slots 12 (having a typical 1.75 inch width W) formed in a deck socket 14 of a transportation vessel, e.g., a ship. As shown in FIG. 2, a load force can be oriented in multiple directions characterized by projections on a surface of the deck with symmetric angles A and angle B in a vertical surface of symmetry plane of a slot 12. Referring now to FIG. 3, hook 10 includes a body member 16 which includes upper part 18 and an upper foot 22 pivotally connected to upper part 18. Body member 16 further includes an angled lower part 20 and a lower foot 24 pivotally connected to lower part 20. In one preferred embodiment, a lashing eyelet 26 symmetrically merges with upper part 18. Upper and lower feet 22 and 24 include openings 28 and 30, respectively, which are sized to accommodate the upper and lower parts, respectively.

Figure 4:
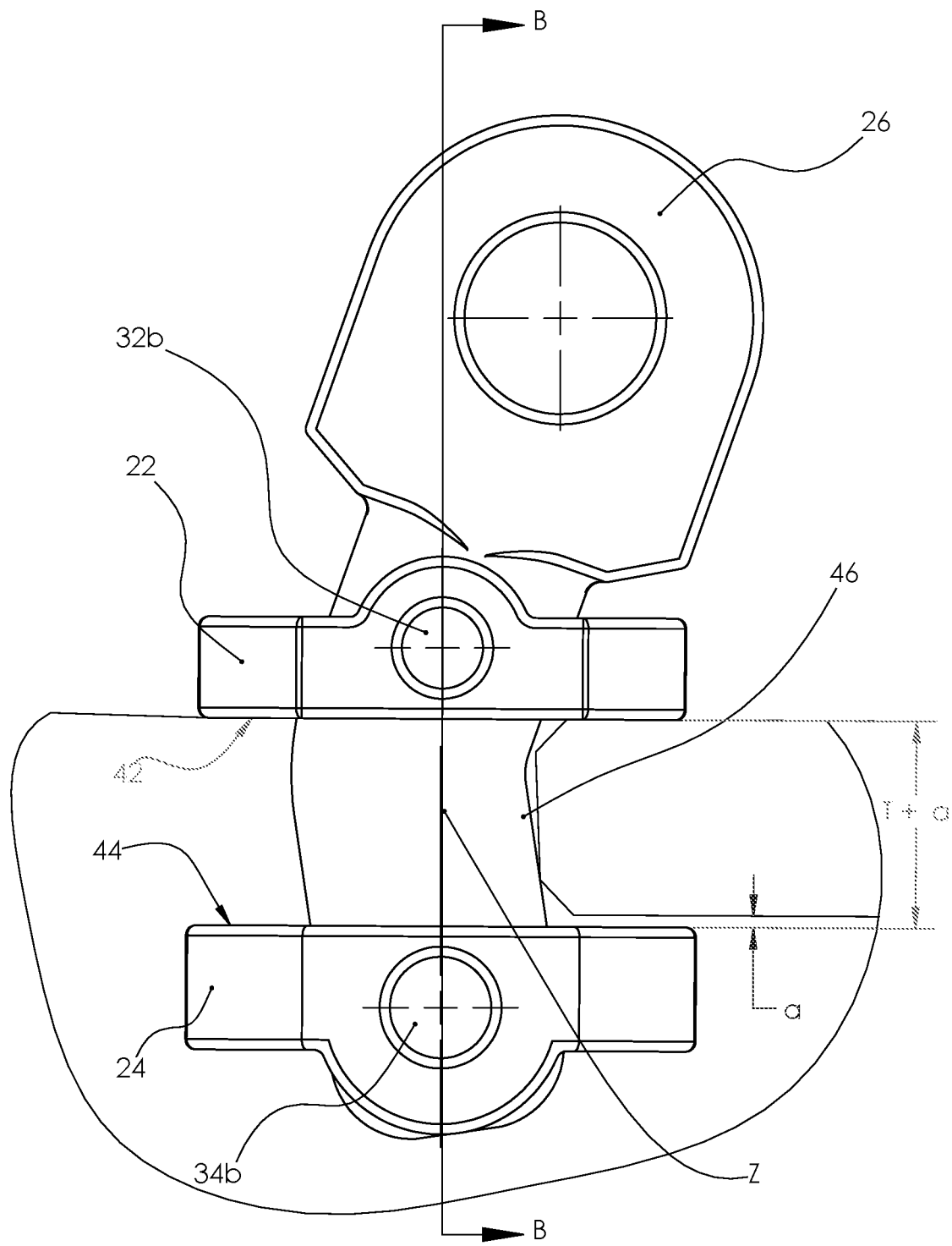
FIG. 4 is an enlarged detail of the deck hook (in a pre-installed condition)
Figure 5:
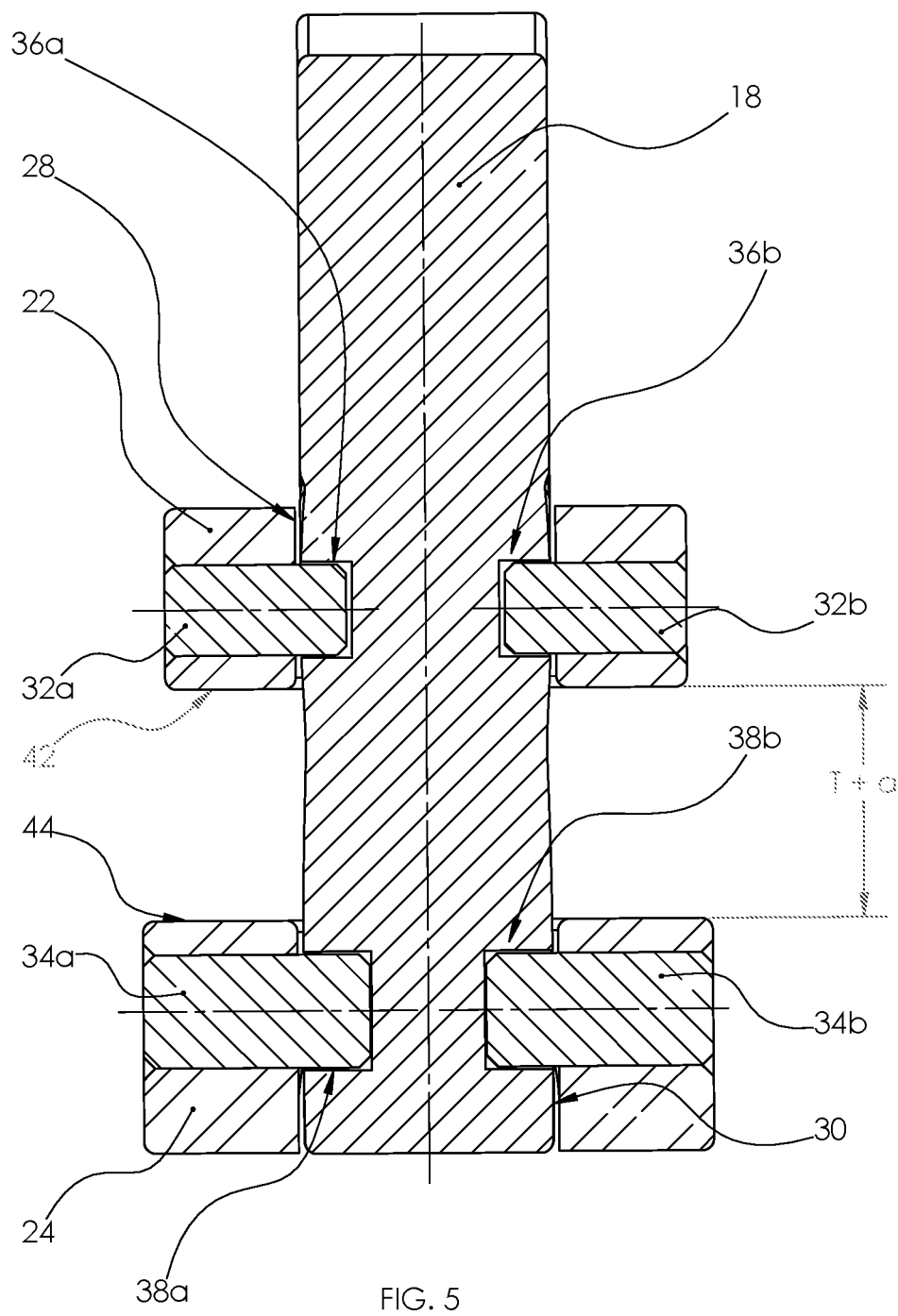
FIG. 5 is a cross sectional view taken along lines B-B of FIG. 4.

Referring now to FIGS. 4-5, shafts 32a and 32b, and shafts 34a and 34b, are press-fitted into feet 22 and 24, respectively, and pivotally fit in coaxial holes 36a and 36b of upper body 18, and coaxial holes 38a and 38b of lower body 20. In the orientation of FIG. 4, a distance "T+a" is defined along an axis Z, axis Z passing through the center of holes 36b and 38b and being oriented perpendicular to the upper surface of the socket. Distance T is selected to match the thickness of socket 14. Distance "T+a" is preferably slightly greater than the thickness of socket 14, which provides tolerance to allow for positioning of the socket into rounded end 13 of slot 12. In one preferred embodiment, body member 16 is sized such that distance a is approximately 0.060 to 0.090 inches, and more preferably about 0.080 inches.

Figure 6:
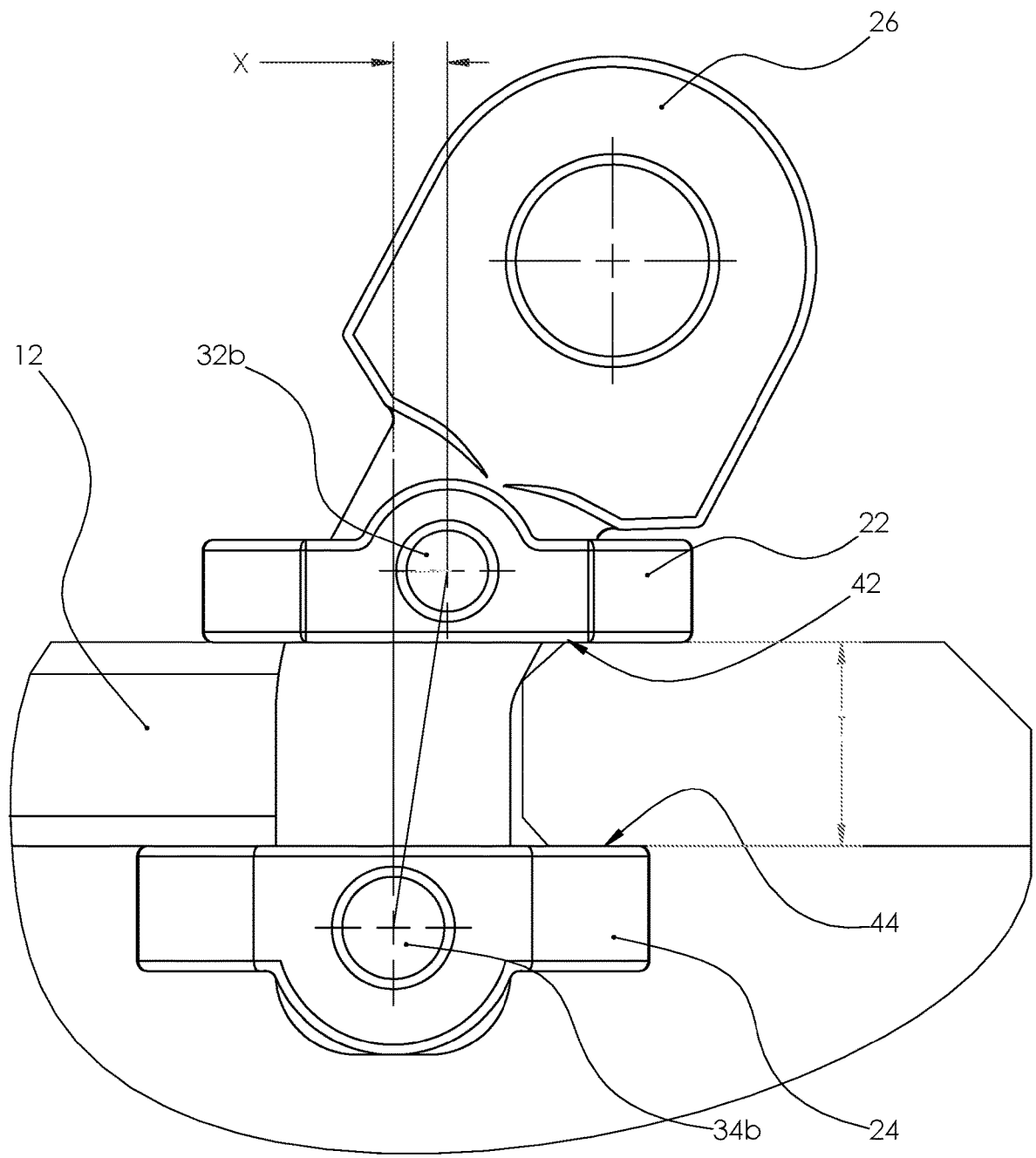
FIG. 6 is an enlarged detail similar to FIG. 4 (in an installed condition).

Feet 22 and 24 are shown in the installed position in FIG. 6. When in the installed position, foot 22 and foot 24 are parallel, with surface 42 of upper foot 22 contacting the upper surface of socket 14 and surface 44 of lower foot 24 contacting the lower surface of socket 14.

As best shown in FIG. 4, lower part 20 includes deck engaging surface 46 to contact, when in the installed condition, the rounded end 13 of slot 12. The radius of cylindrical surface 46 is formed to conform as close as possible to the interior radius of rounded end 13, thereby increasing the area of surface contact and thus reducing the contact stresses between such surfaces during a securement operation. In one preferred embodiment, the maximum contact stresses are reduced to a level below the fatigue strength of aluminum, thus greatly reducing the likelihood that the deck hook will cause damage to an aluminum socket 14.

As best shown in FIG. 3, a vector of loading force L applied to some point of eyelet 16 is equivalent to a horizontal vector of projected force H=L×cos A and a vertical vector of projected force V=L×sin A. As mentioned above, angle B is variable so forces H and V are variable too. Despite the fact that the values of forces H an V are variable, their directions and contact areas on the aluminum socket 14 are unchangeable. Force V always results in a predetermined and known contact between socket 14 and surface 44 of lower foot 24. Force H always results in a predetermined and known contact between the rounded end 13 of slot 12 and engaging surface 46 of hook 10. Both feet 22 and 24 stay coincidental with top and lower surfaces of socket 14, respectively, to completely eliminate any edge contacts therebetween in any conditions, thereby reducing/eliminating any likelihood of damage to the aluminum surfaces.

Deck hook 10 is shown in the installed condition in FIG. 6. In this orientation, cylindrical surface 46 is pressed against the rounded end 13 of slot 12. Pressing deck hook into the rounded end 13 of slot 12 causes upper foot 22 to shift to the right a distance X (see FIG. 6), thereby reducing the vertical distance between it and lower foot 24 to a distance T, whereby surface 42 of upper foot 22 contacts the upper surface of socket 14 and whereby surface 44 of lower foot 24 contacts the lower surface of socket 14.

Accordingly, the novel design of the present invention provides a hook which engages a conventional deck socket over an increased and constant surface area throughout a wide range and direction of loading forces, thereby keeping the contact stresses equal or lower than the fatigue strength of the material used for the socket.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

What is claimed is:

1. A deck hook for connection to a socket installed in a deck of a transportation vehicle, said socket having a thickness T and including a plurality of slots, each of said slots defining a width W and having a rounded end located proximate the outer circumference of said socket, comprising:
    a body member having an upper part and a lower part extending at an angle from said upper part, each of said upper and lower parts including a pair of opposing coaxially-located holes;
    an upper foot having an opening therethrough, said upper part extending through said opening in said upper foot, said upper foot being pivotally connected to said upper part;
    a lower foot having an opening therethrough, said lower part extending through said opening in said lower foot, said lower foot being pivotally connected to said lower part;
    said body member defining an axis Z, said axis Z passing through the center of one of said holes in said upper part and through the center of one of said holes in said lower part, said axis Z being oriented perpendicular to the upper surface of said socket; said axis Z defining a distance T+a between a lower surface of said upper foot and an upper surface of said lower foot;
    and wherein distance T+a is selected to allow installation of said hook within said slot of said socket;
    and wherein a distance T is defined between a lower surface of said upper foot and an upper surface of said lower foot when said hook is in an installed condition.

2. The hook according to claim 1, further comprising a lashing eyelit extending from said upper part.

3. The hook according to claim 1, further comprising a plurality of shafts for pivotally connecting said upper foot to said upper part and said lower foot to said lower part, said shafts being press-fit through said upper and lower feet to engage said holes in said upper and lower parts, respectively.

4. The hook according to claim 1, wherein dimension a is preferably from about 0.060 inches to 0.090 inches.

5. The hook according to claim 4, wherein dimension a is preferably about 0.080 inches.

\* \* \* \* \*